(12) United States Patent
Guetta et al.

(10) Patent No.: US 12,301,492 B2
(45) Date of Patent: May 13, 2025

(54) TIME DOMAIN DEMODULATION REFERENCE SIGNAL FOR CHANNEL ESTIMATION

(71) Applicant: QUALCOMM Incorporated, San Diego, CA (US)

(72) Inventors: Matan Guetta, Kiryat Ono (IL); Peer Berger, Hod Hasharon (IL); Moshe Ben-Ari, Rehovot (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 17/656,180

(22) Filed: Mar. 23, 2022

(65) Prior Publication Data

US 2023/0308233 A1 Sep. 28, 2023

(51) Int. Cl.
*H04L 25/02* (2006.01)
*H04L 5/00* (2006.01)

(52) U.S. Cl.
CPC ........ *H04L 5/0048* (2013.01); *H04L 25/0202* (2013.01)

(58) Field of Classification Search
CPC ... H04L 25/0202; H04L 5/0051; H04L 27/10; H04L 5/0048
See application file for complete search history.

(56) References Cited

U.S. PATENT DOCUMENTS

| | | | |
|---|---|---|---|
| 2012/0020323 A1* | 1/2012 | Noh | H04L 5/0023 370/330 |
| 2014/0293900 A1 | 10/2014 | Takeda et al. | |
| 2015/0230211 A1* | 8/2015 | You | H04L 5/0051 370/330 |
| 2016/0366658 A1* | 12/2016 | Chae | H04W 56/0015 |
| 2018/0083811 A1* | 3/2018 | Kumpula | H04L 25/03159 |
| 2018/0262308 A1* | 9/2018 | Si | H04L 5/0053 |
| 2019/0306808 A1* | 10/2019 | Gao | H04W 72/0473 |
| 2020/0168868 A1* | 5/2020 | Haerle | H01M 50/20 |
| 2020/0328870 A1* | 10/2020 | Kim | H04W 56/001 |
| 2021/0288750 A1* | 9/2021 | Chen | H04J 13/0022 |
| 2022/0095307 A1* | 3/2022 | Chen | H04L 5/0055 |

OTHER PUBLICATIONS

International Search Report and Written Opinion—PCT/US2023/062490—ISA/EPO—May 30, 2023.

* cited by examiner

*Primary Examiner* — Chi Ho A Lee
*Assistant Examiner* — Andrew Lee
(74) *Attorney, Agent, or Firm* — Harrity & Harrity LLP/Qualcomm Incorporated

(57) ABSTRACT

Various aspects of the present disclosure generally relate to wireless communication. In some aspects, a network node may obtain a demodulation reference signal (DMRS) having a constant envelope in a time domain. The network node may generate a communication signal based at least in part on multiplexing the DMRS with a plurality of data resource elements. Numerous other aspects are described.

30 Claims, 13 Drawing Sheets

TIME DOMAIN DEMODULATION REFERENCE SIGNAL FOR CHANNEL ESTIMATION

FIELD OF THE DISCLOSURE

Aspects of the present disclosure generally relate to wireless communication and to techniques and apparatuses for time domain demodulation reference signal for channel estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include obtaining a demodulation reference signal (DMRS) having a constant envelope in a time domain. The method may include generating a communication signal based at least in part on multiplexing the DMRS with a plurality of data resource elements (REs).

Some aspects described herein relate to a method of wireless communication performed by a user equipment (UE). The method may include receiving a communication signal that includes a DMRS that is multiplexed with a plurality of data REs. The method may include separating the DMRS from the plurality of data REs, wherein the DMRS has a constant envelope in a time domain.

Some aspects described herein relate to an apparatus for wireless communication performed by a UE. The apparatus may include a memory and one or more processors, coupled to the memory. The one or more processors may be configured to obtain a DMRS having a constant envelope in a time domain. The one or more processors may be configured to generate a communication signal based at least in part on multiplexing the DMRS with a plurality of data REs.

Some aspects described herein relate to an apparatus for wireless communication performed by a network node. The apparatus may include a memory and one or more processors, coupled to the memory. The one or more processors may be configured to receive a communication signal that includes a DMRS that is multiplexed with a plurality of data REs. The one or more processors may be configured to separate the DMRS from the plurality of data REs, wherein the DMRS has a constant envelope in a time domain.

Some aspects described herein relate to a non-transitory computer-readable medium that stores a set of instructions for wireless communication by a network node. The set of instructions, when executed by one or more processors of the network node, may cause the network node to obtain a DMRS having a constant envelope in a time domain. The set of instructions, when executed by one or more processors of the network node, may cause the network node to generate a communication signal based at least in part on multiplexing the DMRS with a plurality of data REs.

Some aspects described herein relate to a non-transitory computer-readable medium that stores a set of instructions for wireless communication by a UE. The set of instructions, when executed by one or more processors of the UE, may cause the UE to receive a communication signal that includes a DMRS that is multiplexed with a plurality of data REs. The set of instructions, when executed by one or more processors of the UE, may cause the UE to separate the DMRS from the plurality of data REs, wherein the DMRS has a constant envelope in a time domain.

Some aspects described herein relate to an apparatus for wireless communication. The apparatus may include means for obtaining a DMRS having a constant envelope in a time domain. The apparatus may include means for generating a communication signal based at least in part on multiplexing the DMRS with a plurality of data REs.

Some aspects described herein relate to an apparatus for wireless communication. The apparatus may include means for receiving a communication signal that includes a DMRS that is multiplexed with a plurality of data REs. The apparatus may include means for separating the DMRS from the plurality of data REs, wherein the DMRS has a constant envelope in a time domain.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
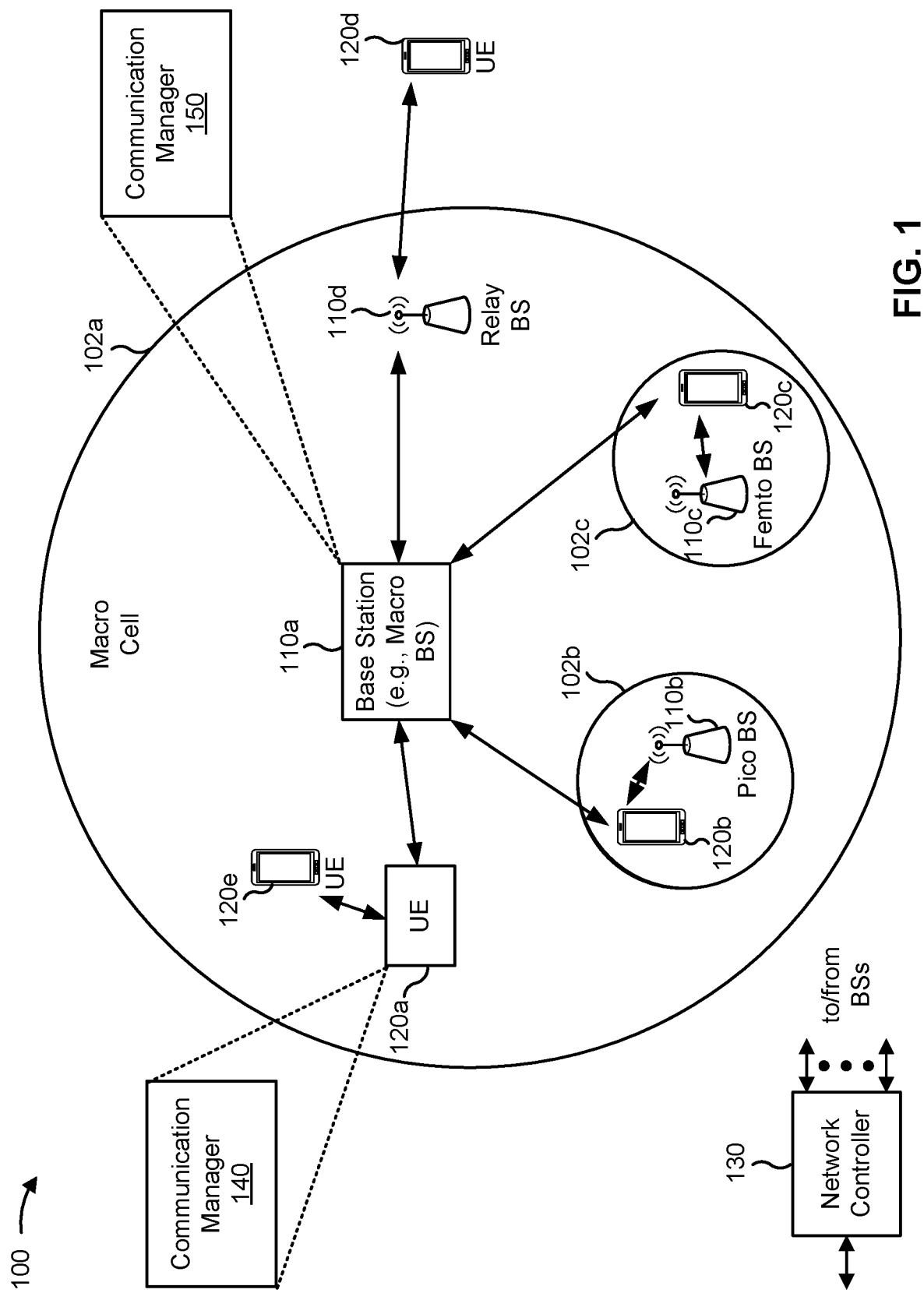
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a communication signal that includes a demodulation reference signal (DMRS) that is multiplexed with a plurality of data REs; and separate the DMRS from the plurality of data REs, wherein the DMRS has a constant envelope in a time domain. Additionally, or alternatively, the communication manager 140 may perform one or more other operations described herein.

In some aspects, a network node (e.g., the base station 110) may include a communication manager 150. As described in more detail elsewhere herein, the communication manager 150 may obtain a DMRS having a constant envelope in a time domain; and generate a communication signal based at least in part on multiplexing the DMRS with a plurality of data REs. Additionally, or alternatively, the communication manager 150 may perform one or more other operations described herein.

As indicated above, FIG. 1 is provided as an example. Other examples may differ from what is described with regard to FIG. 1.

Figure 2:
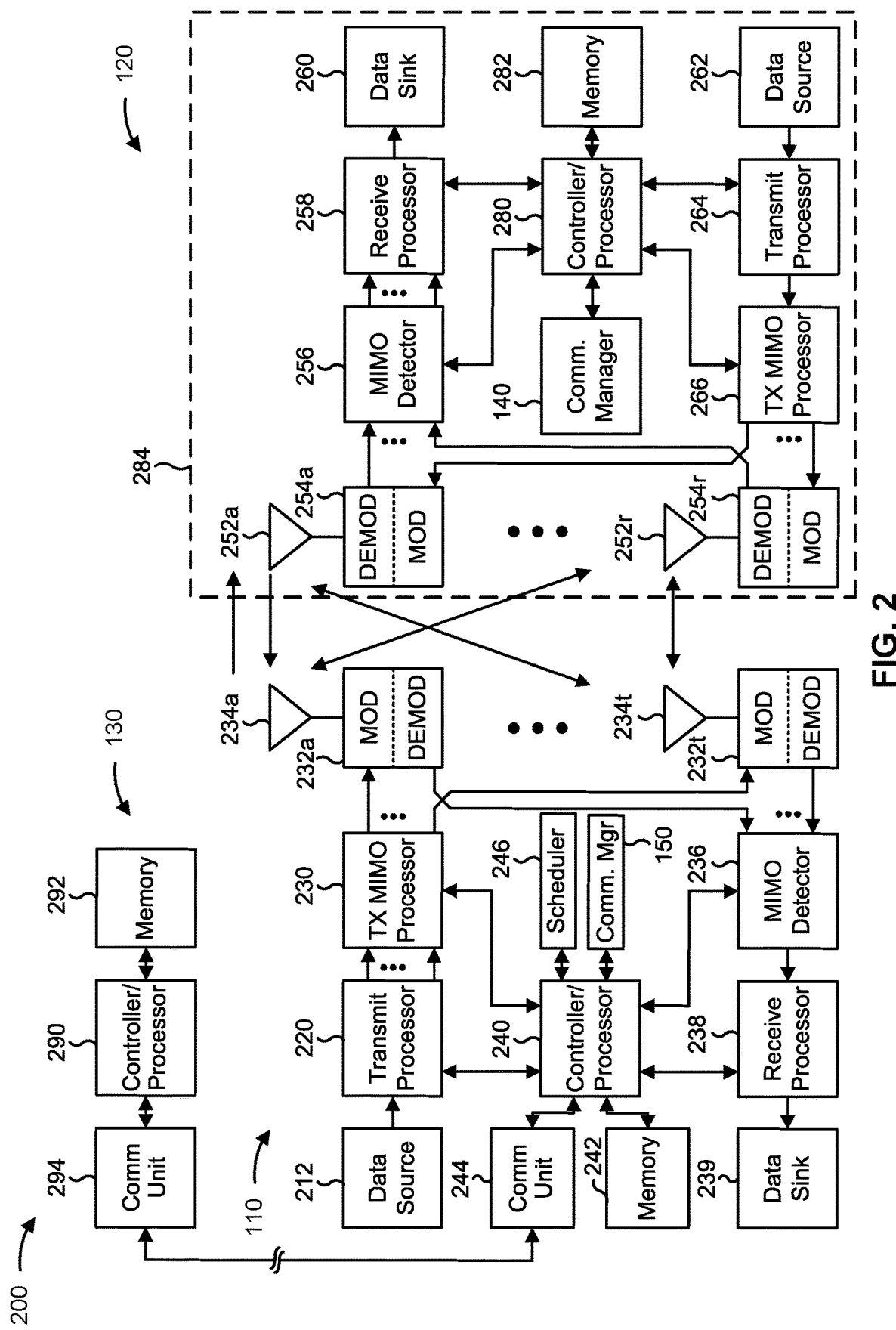
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with time domain DMRS for channel estimation, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples. In some aspects, the network node described herein is the base station 110, is included in the base station 110, or includes one or more components of the base station 110 shown in FIG. 2.

In some aspects, the UE includes means for receiving a communication signal that includes a DMRS that is multiplexed with a plurality of data REs (e.g., using antenna 252, modem 254, MIMO detector 256, receive processor 258, controller/processor 280, memory 282, or the like); and/or means for separating the DMRS from the plurality of data REs, wherein the DMRS has a constant envelope in a time domain (e.g., using controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for obtaining a DMRS having a constant envelope in a time domain (e.g., using antenna 234, modem 232, MIMO detector 236, receive processor 238, controller/processor 240, memory 242, or the like); and/or means for generating a communication signal based at least in part on multiplexing the DMRS with a plurality of data REs (e.g., using controller/processor 240, memory 242, or the like). In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
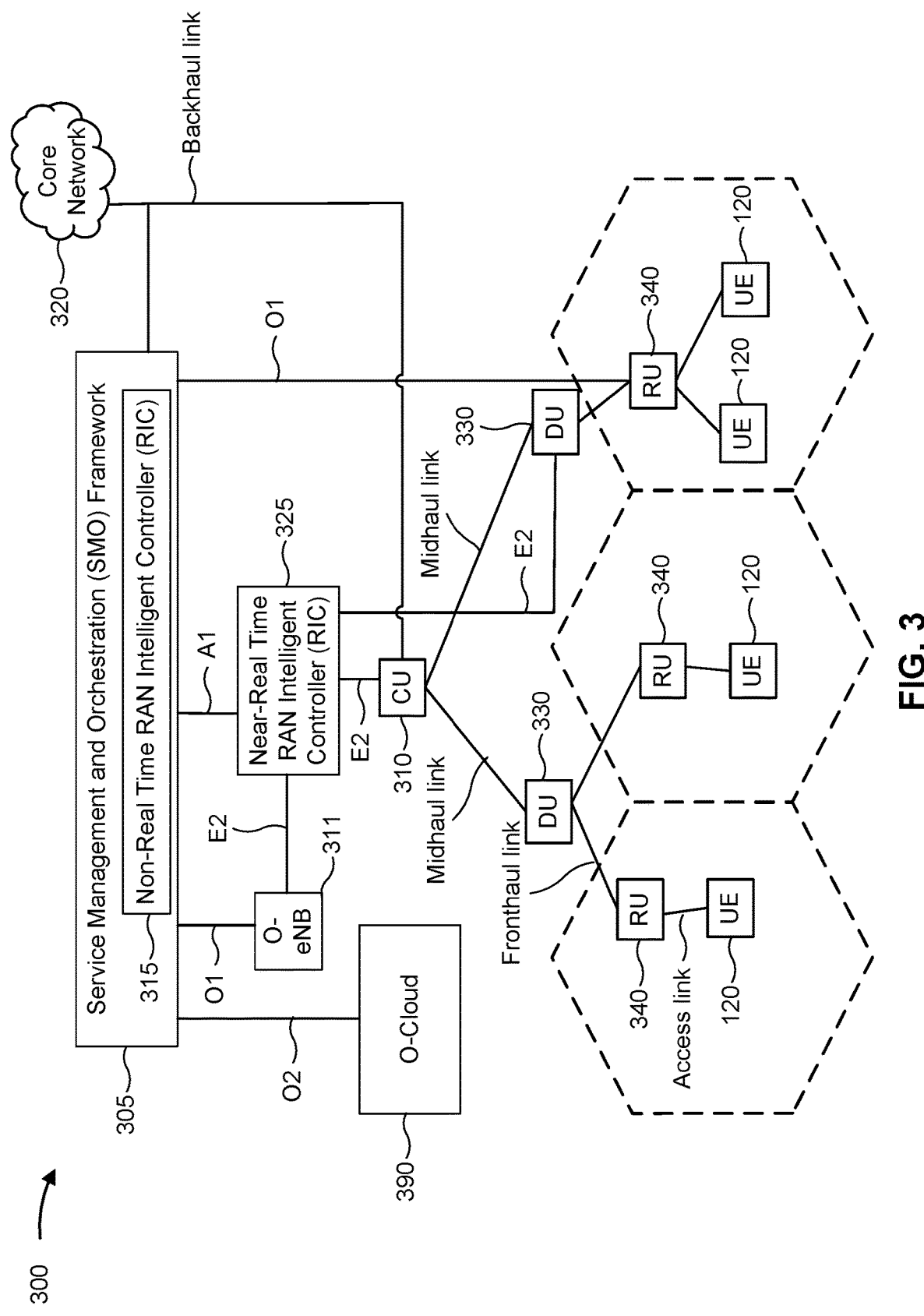
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
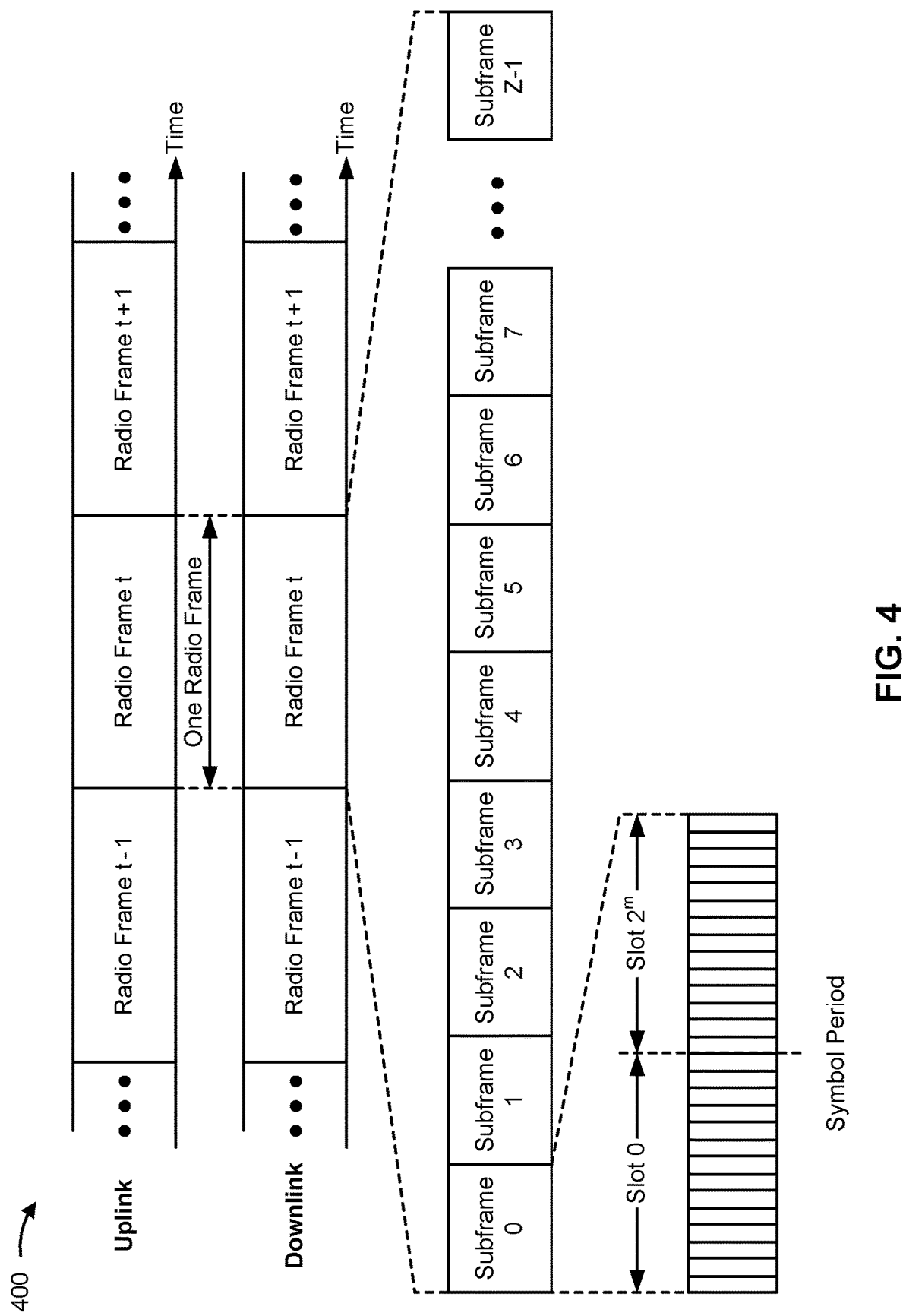
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2 m slots per subframe are shown in FIG. 4, where m is an index of a numerology used for a transmission, such as 0, 1, 2, 3, 4, or another number). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, mini-slot based, or symbol-based.

As indicated above, FIG. 4 is provided as an example. Other examples may differ from what is described with respect to FIG. 4.

Figure 5:
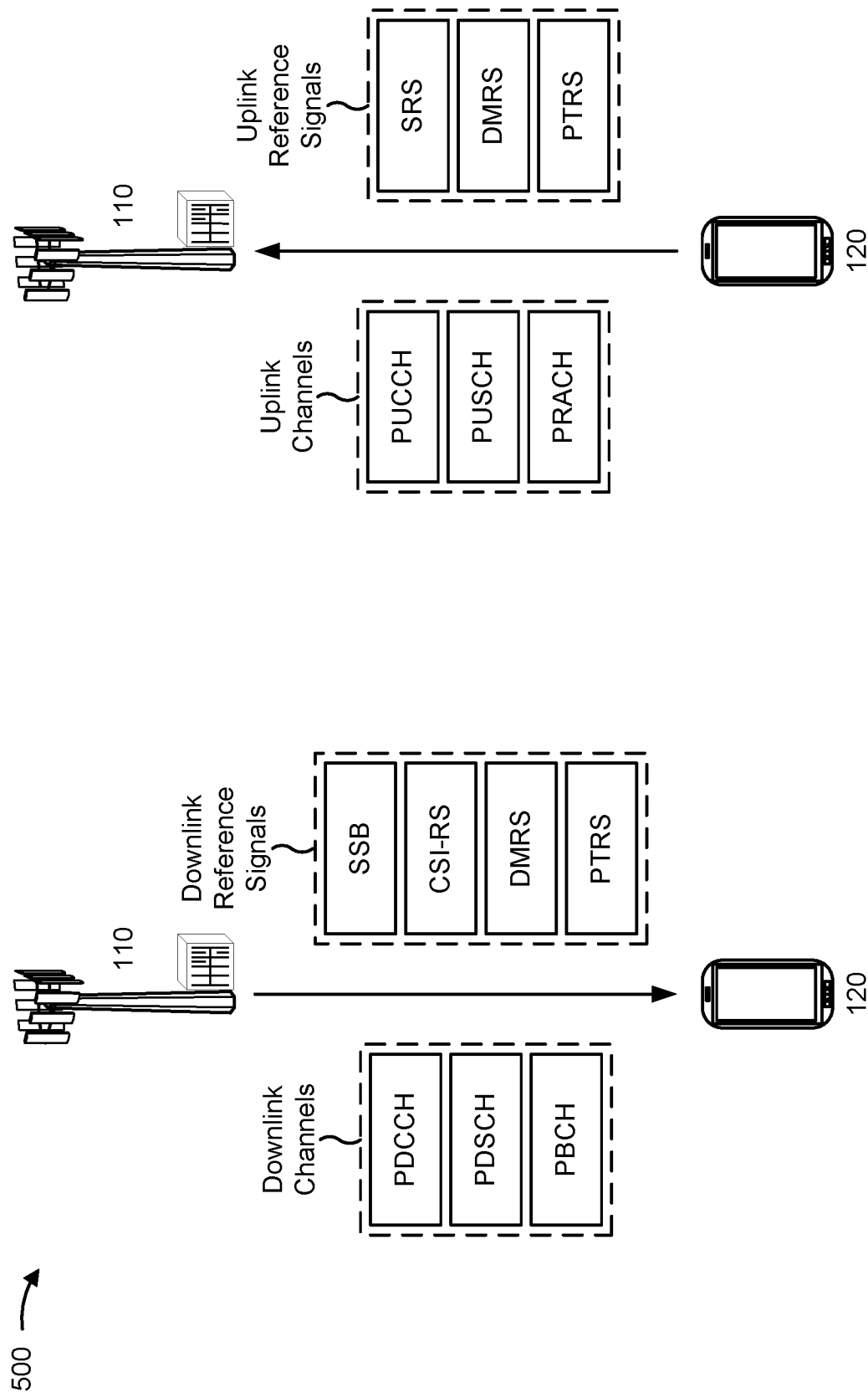
FIG. 5 is a diagram illustrating an example of physical channels and reference signals in a wireless network, in accordance with the present disclosure.

FIG. 5 is a diagram illustrating an example 500 of physical channels and reference signals in a wireless network, in accordance with the present disclosure. As shown in FIG. 5, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

In some cases, the UE 120 may use the DMRS to estimate the propagation channel experienced by the PBCH. The resultant information may be used to help demodulate the PBCH and subsequently decode the master information block (MIB). In some examples, the DMRS may occupy 144 resource elements. The resource elements may be interleaved with the resource elements allocated to the PBCH. The combination of the synchronization signals, PBCH and DMRS for the PBCH may form an SS/PBCH block. The SS/PBCH block may occupy four symbols in the time domain and 240 subcarriers in the frequency domain. In some cases, the DMRS itself may be a pseudo-random sequence length of 144. The variables used to initialize the pseudo random sequence may depend upon the operating band. In some cases, the UE 120 may know the physical cell identifier (PCI) at the time of decoding the PBCH but may not always know the other variables (e.g., when completing initial cell selection). In some cases, the UE 120 may need to complete blind decoding attempts to deduct these variables.

In some cases, the UE 120 may use the DMRS to estimate the propagation channel experienced by the PDCCH. The resultant information may be used to help demodulate the PDCCH and subsequently decode the DCI. In some cases, the DMRS may occupy twenty five percent (25%) of the resource elements within resource blocks used by the PDCCH. These resource elements may be in fixed positions which do not depend upon the PCI nor any other planning parameter. In some cases, the UE 120 (by default) may assume that the DMRS for the PDCCH is quasi-located with the SS/PBCH block in terms of Doppler shift, Doppler spread, average delay, delay spread, and spatial receive parameters. This may indicate that the PDCCH and the DMRS are beamformed in the same way as the selected SS/PBCH block. In some cases, the DMRS is a pseudo-random sequence which may be initialized using the PCI.

In some cases, the PDSCH is transmitted in combination with the DMRS. The DMRS and PDSCH may be transmitted using the same precoding and antenna ports (e.g., they both experience the same composite propagation channel). The UE 120 may have knowledge of the sequence transmitted by the DMRS so the UE 120 may be able to deduce the composite propagation channel by comparing the received DMRS with the transmitted DMRS. In some cases, the DMRS may be transmitted within the set of resource blocks allocated to the PDSCH. For example, if the UE 120 is allowed ten resource blocks for the PDSCH, then both the DMRS and the PDSCH may be transmitted across those ten resource blocks.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random quadrature phase shift keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some cases, as described in more detail below, the DMRS may be multiplexed with a plurality of data REs for channel estimation.

As indicated above, FIG. 5 is provided as an example. Other examples may differ from what is described with regard to FIG. 5.

Figure 6:
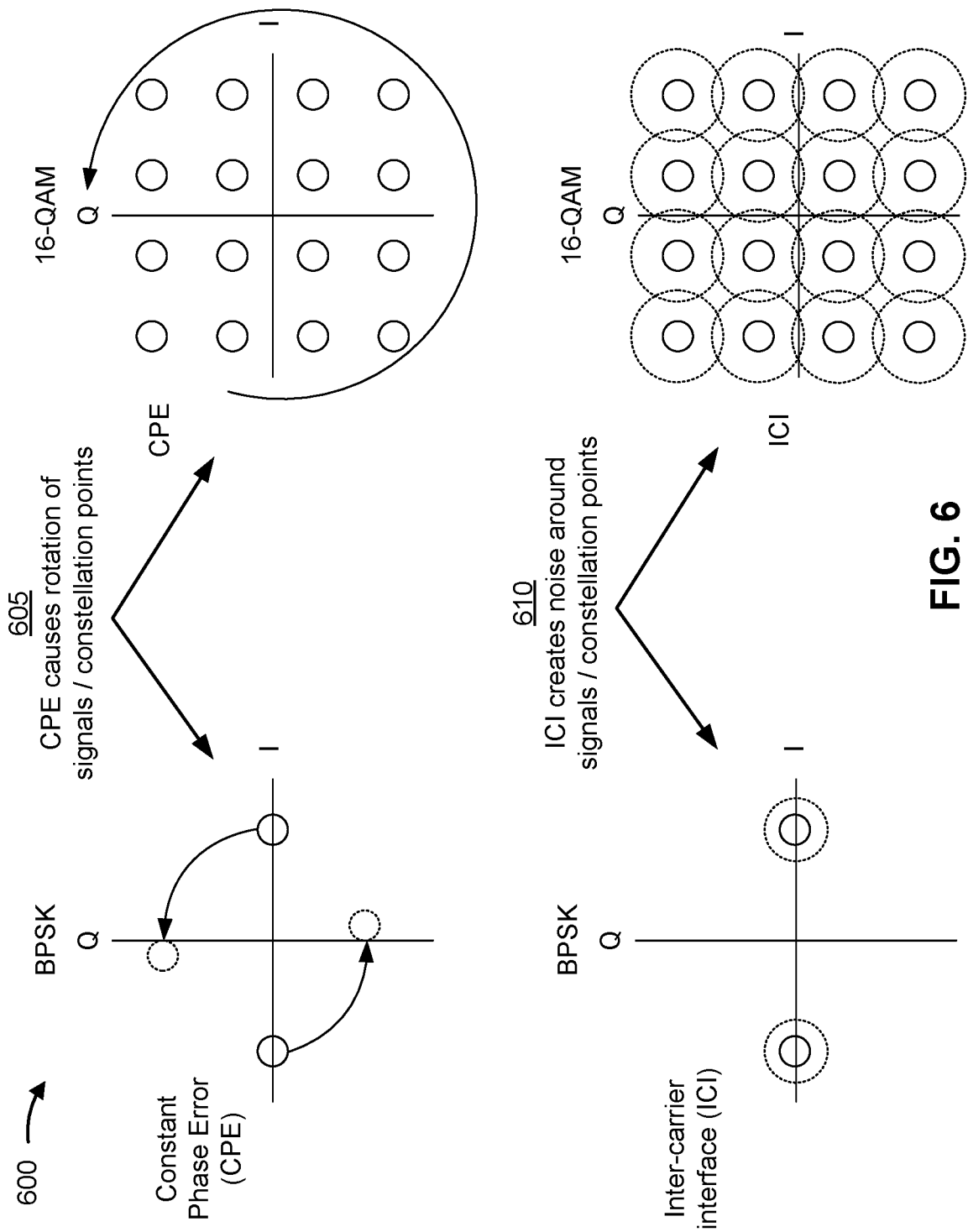
FIG. 6 is a diagram illustrating an example of constant phase error and inter-carrier interference for different modulation and coding schemes, in accordance with the present disclosure.

FIG. 6 is a diagram illustrating an example 600 of constant phase error and inter-carrier interference for different modulation and coding schemes, in accordance with the present disclosure.

FIG. 6 shows the impact of CPE and inter-carrier interference (ICI) on a constellation diagram used to demodulate signals. A constellation diagram is a representation of a signal modulated by a digital modulation scheme, such as binary phase shift keying (BPSK), π/2 BPSK, QPSK, quadrature amplitude modulation (QAM) (such as 16-QAM, 64-QAM, 128-QAM, 256-QAM, or the like), and/or the like. A constellation diagram illustrates a signal as a two-dimensional scatter diagram with an x axis (e.g., a horizontal real axis representing an in-phase carrier, shown as an I component) and a y axis (e.g., a vertical imaginary axis representing a quadrature carrier, shown as a Q component). The angle of a constellation point, measured counterclockwise from the horizontal axis, represents a phase shift of a carrier wave from a reference phase. The distance to a constellation point, measured from the origin, represents the amplitude or power of the signal.

In a digital modulation system, information is transmitted as a series of samples, each occupying a uniform time slot. During each sample, the carrier wave has a constant amplitude and phase that is restricted to one of a finite number of values, so each sample encodes one of a finite number of symbols, which in turn represent one or more binary digits (bits) of information. Each symbol is encoded as a different combination of amplitude and phase of the carrier, so each symbol is represented by a point on the constellation diagram, called a constellation point. The constellation diagram shows all the possible symbols that can be transmitted by the system as a collection of points.

During demodulation, a demodulator identifies a constellation point with a highest likelihood of corresponding to a received signal (e.g., a received sample). Under good channel conditions, the received signal experiences a small amount of noise and/or interference, and thus the demodulator is more likely to identify a constellation point that correctly corresponds to the received signal. However, when the received signal is subject to a higher amount of noise and/or interference, the demodulator is more likely to incorrectly identify a constellation point from the signal, resulting in inaccurate demodulation and incorrect bit determination.

As shown by reference number 605, CPE is a type of phase noise that causes a rotation of a signal, around the origin, from a constellation point that corresponds to the signal. As further shown, different MCSs may have different degrees of robustness against CPE as compared to ICI. For example, BPSK may be less robust against CPE (e.g., as compared to ICI) because a rotation by 90 degrees or more may cause the received signal to be mapped to an incorrect constellation point. As another example, 16-QAM may be more robust against CPE (e.g., as compared to ICI).

As shown by reference number 610, ICI is a type of phase noise that creates noise (e.g., a random cloud of noise) around each constellation point. As further shown, different MCSs may have different degrees of robustness against ICI as compared to CPE. For example, BPSK may be more robust against ICI (e.g., as compared to CPE) because the constellation points are far apart, and thus a cloud of noise around a constellation point is less likely to cause incorrect constellation point identification as compared to CPE. As another example, 16-QAM may be less robust against ICI (e.g., as compared to CPE) because the constellation points are closer together, and thus a cloud of noise around each constellation point is more likely to lead to misidentification of an adjacent constellation point as compared to CPE.

Thus, in some conditions (such as some MCSs), CPE may have a bigger impact on the accuracy of demodulation than ICI, and in other conditions (such as other MCSs) ICI may have a bigger impact on the accuracy of demodulation than CPE. These conditions are provided as examples, and other conditions may cause varying impacts of CPE and ICI on demodulation performance, as described in more detail in connection with FIG. 5. Some techniques and apparatuses described herein improve demodulation performance by accounting for these conditions when mitigating CPE and ICI.

In some cases, the ICI may be caused by Doppler spread. Doppler spread may refer to the widening of a spectrum of a narrow-band signal that is transmitted through a multipath propagation channel. In some cases, the Doppler spread may be due to the relative motion between a transmitter (e.g., a network node) and a receiver (e.g., a UE), and/or the relative motion in the propagation environment.

In some cases, Doppler spread may cause ICI that changes within a resource element (RE) or between resource elements (REs). In high Doppler spread scenarios, the ICI may be destructive to the channel quality. For example, the ICI may cause the channel estimation quality and performance to degrade over time. In other words, channel estimation may be difficult to perform in high Doppler spread scenarios. This may result in an increased bit error rate, and may increase the difficulty in performing scheduling, link adaptation, or beam management, among other examples. In some cases, a frequency offset estimation may be performed using the DMRS and using interpolation to other REs. However, this interpolation may introduce estimation error, and may not allow for the estimation of the ICI within an OFDM symbol.

Techniques and apparatuses are described herein for a time domain DMRS for channel estimation. In some aspects, a network node may obtain a DMRS having a constant envelope in the time domain. For example, the network node may generate a plurality of DMRS pilot samples having the constant envelope in the time domain. The network node may multiplex the DMRS with a plurality of data resource elements to generate a communication signal, and may transmit the communication signal for channel estimation. In some aspects, a UE may receive the communication signal having the DMRS that is multiplexed with the plurality of data resource elements, and may separate the DMRS from the plurality of data resource elements for performing the channel estimation.

As described above, channel estimation may be difficult to perform in high Doppler spread scenarios. This may result in an increased bit error rate, and may increase the difficulty in performing scheduling, link adaptation, or beam management, among other examples. Using the techniques and apparatuses described herein, a communication signal for channel estimation may be generated based at least in part on a plurality of DMRS pilot resource elements that are multiplexed with a plurality of data resource elements. This may enable the frequency offset estimation to be performed with a higher degree of accuracy, may decrease the impact of the ICI, and may improve the communication performance in high Doppler spread scenarios.

As indicated above, FIG. 6 is provided as an example. Other examples may differ from what is described with regard to FIG. 6.

Figure 7:
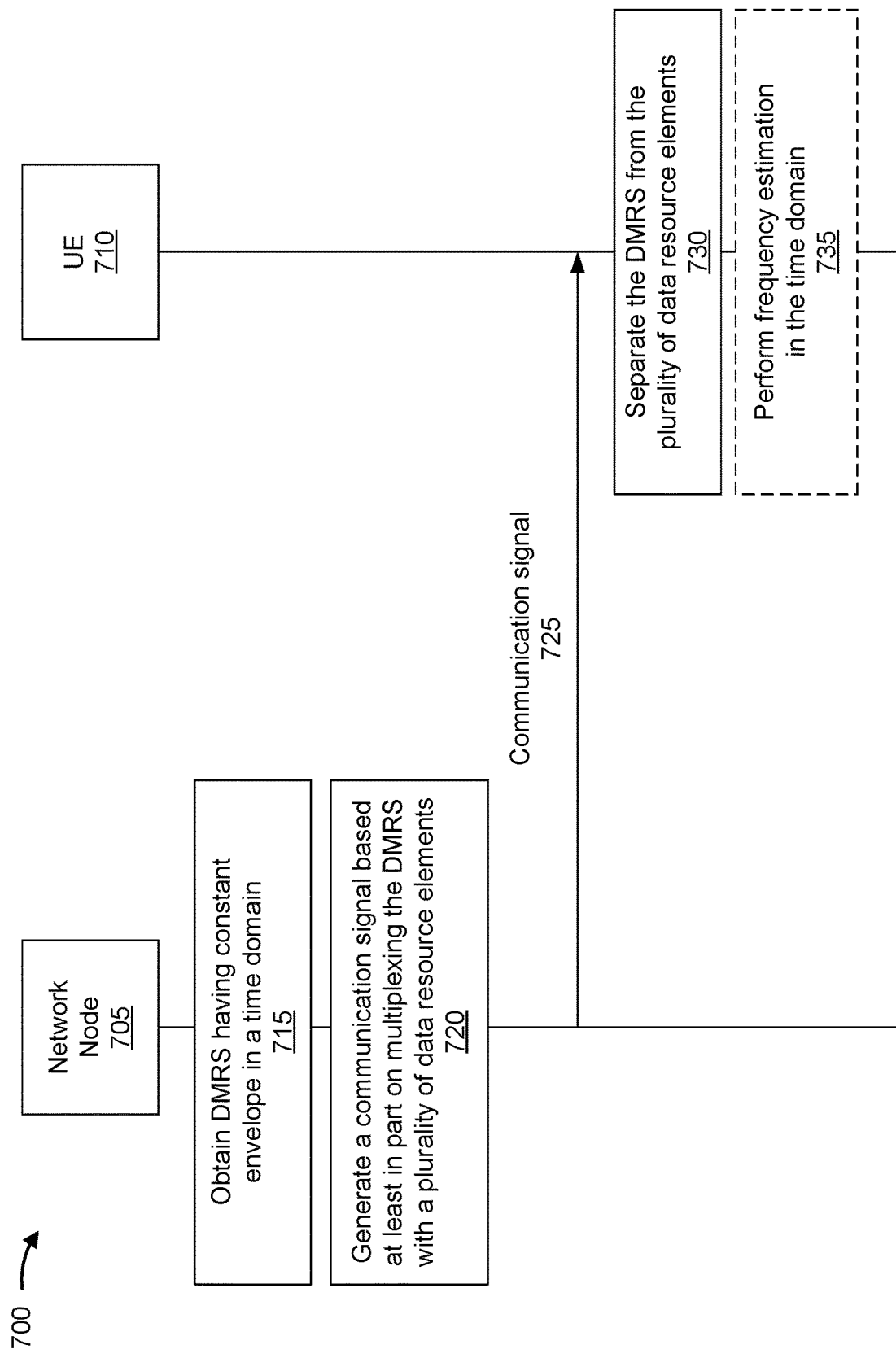
FIG. 7 is a diagram illustrating an example associated with a time domain demodulation reference signal (DMRS) for channel estimation, in accordance with the present disclosure.

FIG. 7 is a diagram illustrating an example 700 of a time domain DMRS for channel estimation, in accordance with the present disclosure. A network node, such as the network node 705, may communicate with a UE, such as the UE 710. The network node 705 may include some or all of the features of the aggregated or the disaggregated base station described herein. The UE 710 may include some or all of the features of the UE 120.

As shown in connection with reference number 715, the network node 705 may obtain a DMRS having a constant envelope in the time domain. In some aspects, the DMRS may include a plurality of DMRS pilot samples, and the plurality of DMRS pilot samples may have a constant envelope in the time domain. In some aspects, the constant envelope in the time domain may indicate that each of the DMRS pilot samples has an absolute value of one. In some aspects, the DMRS may include a Zadoff-Chu (ZC) sequence.

As shown in connection with reference number 720, the network node 705 may generate a communication signal based at least in part on multiplexing the DMRS with the plurality of data REs. In some aspects, the network node 705 may generate a plurality of DMRS pilot REs based at least in part on converting the plurality of time domain DMRS pilot symbols to the frequency domain. In some aspects, the network node 705 may multiplex the DMRS pilot REs with the plurality of data REs to generate the communication signal.

In some aspects, the DMRS pilot REs may be moving DMRS pilot REs. For example, the DMRS pilot REs may be located at different locations in the allocation (in the frequency domain) for different time periods. In one example, the DMRS pilot REs may be inserted into a first location of the plurality of data REs (in the frequency domain) at a first time (e.g., t0) and may be inserted into a second location of the plurality of REs (in the frequency domain) at a second time (e.g., t1). In some aspects, the communication signal may be generated based at least in part on multiplexing the DMRS pilot REs with the plurality of data REs at the first location corresponding to the first time and at the second location corresponding to the second time. In some aspects, the location(s) may be referred to as bin(s). For example, the first location of the DMRS pilot RE within the plurality of data RE may be a first bin, and the second location of the DMRS pilot REs within the plurality of data REs may be a second bin. In some aspects, the DMRS pilot REs at the first location (e.g., in the first bin) and the DMRS pilot REs at the second location (e.g., in the second bin) may be the same DMRS pilot REs.

In some aspects, the moving pilots may allow for improved frequency diversity. For example, the moving pilots may allow the frequency and channel estimation to be performed in different REs and at different times. In some aspects, in a group of adjacent pilots, the frequency offset (which may contribute to ICI) may be estimated in a sub-symbol resolution.

In some aspects, the network node 705 may multiplex the DMRS pilot REs with the plurality of data REs in accordance with a density (e.g., a pre-defined density). For example, the density may indicate the number of DMRS pilot REs that should be inserted into the plurality of data REs. Additionally, or alternatively, the density may indicate the number of times that a set (e.g., a sequence) of DMRS pilot REs should be inserted into the plurality of data REs.

In some aspects, the network node may multiplex the DMRS pilot REs with the plurality of data REs according to a sequence length (e.g., a pre-defined sequence length). For example, the sequence length may indicate a desired length of the DMRS pilot REs and the plurality of data REs such that a constant envelope is obtained in the time domain. In some aspects, the sequence length may indicate a desired length of the DMRS pilot REs and the plurality of data REs such that a constant envelope is obtained in the time domain and in the frequency domain.

In some aspects, multiplexing the DMRS pilot REs with the plurality of data REs may include one or more of the following. In some aspects, the network node 705 may obtain (e.g., generate) the time domain DMRS pilot samples. In some aspects, the time domain DMRS pilot samples may be converted to the frequency domain. For example, the network node 705 may apply a discrete Fourier transform (DFT) to the time domain DMRS pilot samples to generate a plurality of frequency domain DMRS pilot REs (e.g., $F^{-1}\{Pilot[n]\}$). In some aspects, the frequency domain DMRS pilot REs may be multiplexed with the plurality of data REs. For example, the frequency domain DMRS pilot REs may be multiplexed with the plurality of data REs in accordance with the one or more REs (as described above). In some aspects, the multiplexed frequency domain DMRS pilot REs and data REs may be converted to the time domain. For example, the network node 705 may apply an IFFT to the multiplexed frequency domain DMRS pilot REs and data REs to generate a communication signal (e.g., a time domain communication signal) for frequency and channel estimation.

Additional details regarding these features are described below in connection with FIG. 8.

As shown in connection with reference number 725, the network node 705 may transmit, and the UE 710 may receive, the communication signal. For example, the network node 705 may transmit, and the UE 710 may receive, the communication signal that includes the DMRS (e.g., the DMRS pilot REs) multiplexed with the plurality of data REs.

As shown in connection with reference number 730, the UE 710 may separate the DMRS from the plurality of data REs.

In some aspects, separating the DMRS pilot REs from the plurality of data REs may include one or more of the following. In some aspects, the UE 710 may obtain (e.g., receive) the time domain communication signal. In some aspects, the time domain communication signal may be converted to the frequency domain. For example, the UE 710 may generate a plurality of frequency domain DMRS pilot REs and plurality of data REs based at least in part on applying an FFT to the time domain communication signal. In some aspects, the UE 710 may separate (in the frequency domain) the frequency domain DMRS pilot REs from the plurality of data REs. In some aspects, the UE 710 may convert the plurality of frequency domain DMRS pilot REs to the time domain samples.

Additional details regarding these features are described below in connection with FIG. 9.

In some aspects, the time domain frequency offset may be performed within an OFDM symbol as follows:

$$F_{offset} = C \cdot \text{angle}\left\{\left(\sum_{0}^{\frac{N}{2}-1} r_i y_i\right)^* \cdot \left(\sum_{\frac{N}{2}}^{N-1} r_i y_i\right)\right\},$$

where:
  C is a constant (e.g., the sub-carrier spacing divided by pi),
  y is the received signal, and
  r is a reference signal (e.g., the DMRS in time domain).
  N is the fft size (depends on the demodulation unit)
Additionally, or alternatively, the time domain frequency offset may be performed within an OFDM symbol as follows:

$$\frac{scs}{pi} \cdot \text{angle}\left\{ e^{j\pi\Delta f} \cdot \left(\sum_{0}^{\frac{N}{2}-1} \left(|s_i|^2 \cdot \alpha_0 + s_i^* \cdot \left(\sum_{Taps} \alpha_j \cdot s_{i-\tau} + n\right)\right) \cdot e^{\frac{j2\pi i}{N}\Delta f}\right)^* \cdot \right.$$
$$\left. \left(\sum_{0}^{\frac{N}{2}-1} \left(\left|s_{i+\frac{N}{2}}\right|^2 \cdot \alpha_0 + s_{i+\frac{N}{2}}^* \cdot \left(\sum_{Taps} \alpha_j \cdot s_{i+\frac{N}{2}-\tau} + n\right)\right) \cdot e^{-\frac{j2\pi i}{N}\Delta f}\right)\right\}$$

where:
s is the DMRS sequence in the time domain,
scs is the sub-carrier spacing,
α is the channel tap, and
n is the environmental or thermal noise.
Δf—the desired frequency offset to be estimated
N—fft size
$s_i$—reference sequence in time domain In some aspects, the total noise ($n_{total}$) in a signal may comprise a sequence noise component ($n_{seq}$), a channel noise component ($n_{channel}$), and the environmental or thermal noise component (n). In some aspects, the total noise may be represented as follows:

$$n_{Total} = n_{seq} + n_{channel} + n = \left[(|s_i|^2 - 1) \cdot \alpha_0\right] + \left[s_i^* \cdot \sum_{Taps} \alpha_j \cdot s_{i-\tau}\right] + [s_i^* \cdot n]$$

As shown by the equation above, if an additive white Gaussian noise (AWGN) channel ($\alpha_0=1$; $\alpha_j=0$ $\forall j\neq 0$) is being used, and the sequence has a unit absolute power ($|s_i|^2=1 \forall i$), the noise variance may be the original thermal noise. In other words, the sequence has a unit variance. Using the formula above, if the DMRS pilot samples ($s_i$) have a constant envelope (e.g., an absolute value of one), then the sequence noise component may be negligible (e.g., may be zero).

As shown in connection with reference number 735, the UE 710 may perform frequency and channel estimation. For example, the UE 710 may perform frequency estimation based at least in part on the plurality of DMRS pilot REs. In some aspects, performing the frequency estimation may comprise determining a frequency offset within an OFDM symbol. In some aspects, the constant envelope DMRS in the time domain may improve the frequency estimation performance by the UE 710. This may reduce the ICI impact and may result in improved channel estimation.

As described above, frequency and channel estimation may be difficult to perform in high Doppler spread scenarios. This may result in an increased bit error rate, and may increase the difficulty in performing scheduling, link adaptation, or beam management, among other examples. Using the techniques and apparatuses described herein, a communication signal for frequency and channel estimation may be generated based at least in part on a plurality of DMRS pilot REs that are multiplexed with a plurality of data REs. This may enable the frequency offset estimation to be performed with a higher degree of accuracy, may decrease the impact of the ICI, and may improve the communication performance in high Doppler spread scenarios.

As indicated above, FIG. 7 is provided as an example. Other examples may differ from what is described with regard to FIG. 7.

Figure 8:
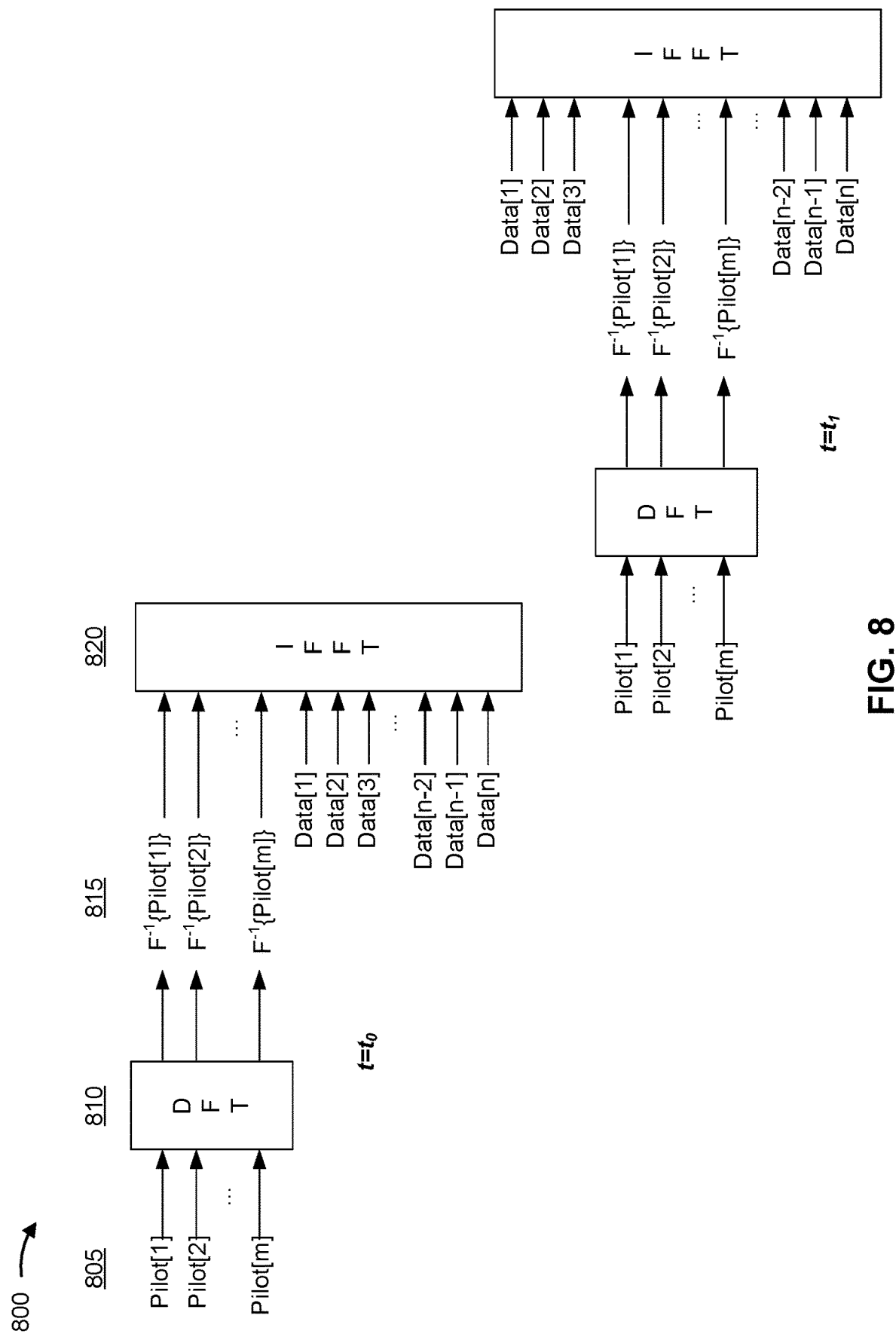
FIG. 8 is a diagram illustrating an example associated with multiplexing DMRS pilot resource elements (REs) and data REs, in accordance with the present disclosure.

FIG. 8 is a diagram illustrating an example 800 of multiplexing DMRS pilot REs and data REs, in accordance with the present disclosure.

In some aspects, multiplexing the DMRS pilot REs with the plurality of data REs may include one or more of the following steps. As shown in connection with reference number 805, the network node 705 may obtain (e.g., generate) the time domain DMRS pilot samples. As shown in connection with reference number 810, the time domain DMRS pilot samples may be converted to the frequency domain REs. For example, the network node 705 may apply a DFT to the time domain DMRS pilot samples to generate a plurality of frequency domain DMRS pilot RE. As shown in connection with reference number 815, the frequency domain DMRS pilot REs may be multiplexed with the plurality of data REs. For example, the frequency domain DMRS pilot REs may be multiplexed with the plurality of data REs in accordance with the one or more REs. As shown in connection with reference number 820, the multiplexed frequency domain DMRS pilot REs and data REs may be converted to the time domain. For example, the network node 705 may apply an IFFT to the multiplexed frequency domain DMRS pilot REs and data REs to generate a communication signal (e.g., a time domain communication signal) for channel estimation.

In some aspects, generating the communication signal may comprise performing the multiplexing steps (e.g., as described in connection with reference numbers 805, 810, 815, and 820), or a subset of the multiplexing steps, for multiple repetitions. For example, as described above, the DMRS pilot REs may be inserted into the plurality of data REs in multiple locations or REs. The multiplexing steps, or the subset of the multiplexing steps, may be performed for each of the locations or REs for the DMRS pilot REs. For example, a first repetition of the multiplexing steps may be performed for multiplexing the DMRS pilot REs in a first RE of the plurality of data REs (at time to), and a second repetition of the multiplexing steps may be performed for multiplexing the DMRS pilot REs in a second RE of the plurality of data REs (at time $t_1$).

As indicated above, FIG. 8 is provided as an example. Other examples may differ from what is described with regard to FIG. 8.

Figure 9:
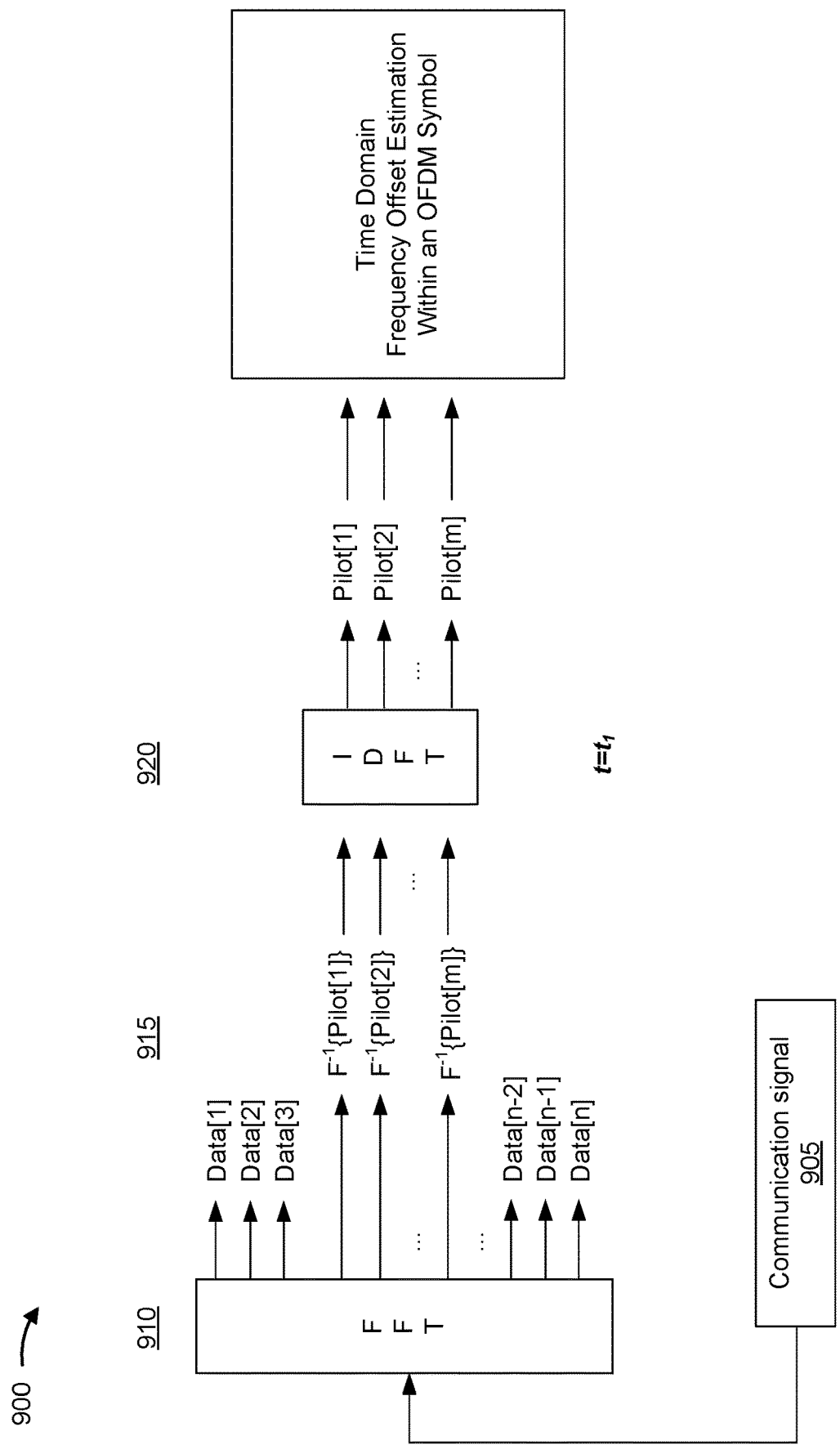
FIG. 9 is a diagram illustrating an example associated with separating DMRS pilot REs and data REs, in accordance with the present disclosure.

FIG. 9 is a diagram illustrating an example 900 of separating DMRS pilot REs and data REs, in accordance with the present disclosure.

In some aspects, separating the DMRS pilot REs from the plurality of data REs may include one or more of the following de-multiplexing steps. As shown in connection with reference number 905, the UE 710 may obtain (e.g., receive) the time domain communication signal. As shown in connection with reference number 910, the time domain communication signal may be converted to the frequency domain. For example, the UE 710 may generate a plurality of frequency domain DMRS pilot REs and plurality of data REs based at least in part on applying an FFT to the time domain communication signal. As shown in connection with reference number 915, the UE 710 may separate (in the frequency domain) the frequency domain DMRS pilot REs from the plurality of data REs. As shown in connection with reference number 920, the UE 710 may convert the plurality of frequency domain DMRS pilot REs to the time domain samples. For example, the UE 710 may generate a plurality of time domain DMRS pilot samples based at least in part on applying an IDFT to the plurality of frequency domain DMRS pilot REs.

In some aspects, separating the DMRS pilot REs from the plurality of data REs may comprise performing the de-multiplexing steps (e.g., as described in connection with reference numbers 905, 910, 915, or 920), or a subset of the de-multiplexing steps, for multiple repetitions. For example, the DMRS pilot REs may be inserted into the plurality of data REs in multiple locations or REs. The de-multiplexing steps, or the subset of the de-multiplexing steps, may be performed for each of the DMRS pilot REs. For example, a first repetition of the de-multiplexing steps may be performed for separating the DMRS pilot REs from the plurality of data REs in a first bin (e.g., at time $t_0$), and a second repetition of the de-multiplexing steps may be performed for separating the DMRS pilot REs from the plurality of data REs in a second bin (e.g., at time $t_1$).

As indicated above, FIG. 9 is provided as an example. Other examples may differ from what is described with regard to FIG. 9.

Figure 10:
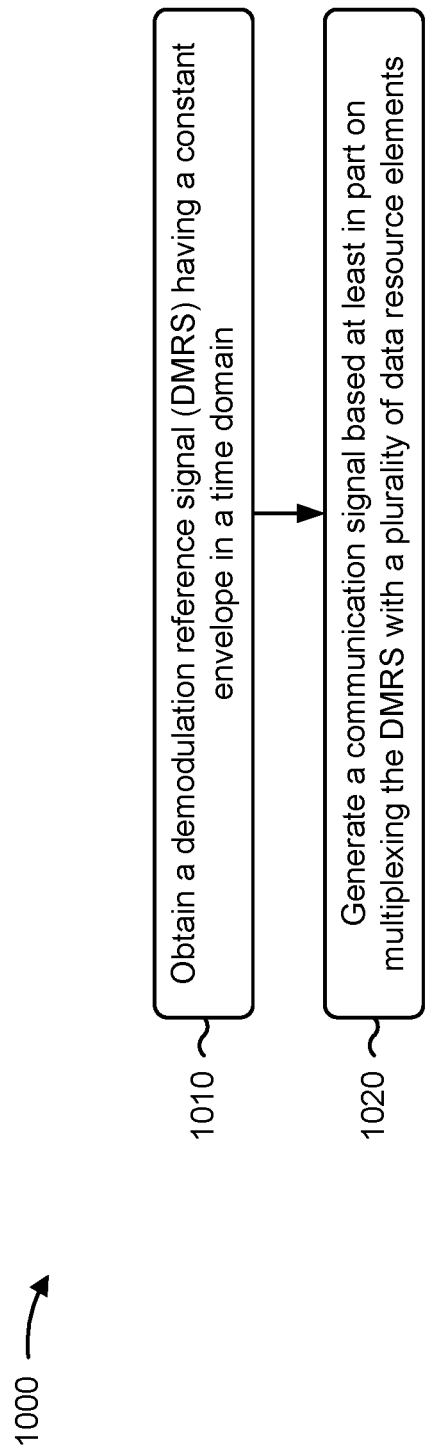
FIG. 10 is a diagram illustrating an example process associated with time DMRS generation for channel estimation, in accordance with the present disclosure.

FIG. 10 is a diagram illustrating an example process 1000 performed, for example, by a network node, in accordance with the present disclosure. Example process 1000 is an example where the network node (e.g., network node 705) performs operations associated with time domain DMRS for frequency and channel estimation.

As shown in FIG. 10, in some aspects, process 1000 may include obtaining a DMRS having a constant envelope in a time domain (block 1010). For example, the network node (e.g., using communication manager 150 and/or obtaining component 1208, depicted in FIG. 12) may obtain a DMRS having a constant envelope in a time domain, as described above, for example, with reference to FIGS. 7, 8, and/or 9.

As further shown in FIG. 10, in some aspects, process 1000 may include generating a communication signal based at least in part on multiplexing the DMRS with a plurality of data REs (block 1020). For example, the network node (e.g., using communication manager 150 and/or generation component 1210, depicted in FIG. 12) may generate a communication signal based at least in part on multiplexing the DMRS REs with a plurality of data REs, as described above, for example, with reference to FIGS. 7, 8, and/or 9.

Process 1000 may include additional aspects, such as any single aspect or any combination of aspects described below and/or in connection with one or more other processes described elsewhere herein.

In a first aspect, obtaining the DMRS having the constant envelope in the time domain comprises generating a plurality of DMRS pilot samples having the constant envelope in the time domain.

In a second aspect, alone or in combination with the first aspect, multiplexing the DMRS REs with the plurality of data REs comprises converting the plurality of DMRS pilot samples having the constant envelope in the time domain to a plurality of frequency domain DMRS pilot REs, and multiplexing, in the frequency domain, the plurality of frequency domain DMRS pilot REs with the plurality of data REs.

In a third aspect, alone or in combination with one or more of the first and second aspects, generating the communication signal comprises generating a time domain communication signal based at least in part on an output of the multiplexing of the plurality of frequency domain DMRS pilot REs with the plurality of data REs.

In a fourth aspect, alone or in combination with one or more of the first through third aspects, process 1000 includes transmitting the communication signal to a UE or a plurality of UEs.

In a fifth aspect, alone or in combination with one or more of the first through fourth aspects, multiplexing the DMRS with the plurality of data REs comprises multiplexing the DMRS with the plurality of data REs based at least in part on a density indication or a sequence length indication.

In sixth aspect, alone or in combination with one or more of the first through fifth aspects, multiplexing the DMRS with the plurality of data REs comprises performing a first multiplexing operation with the DMRS in a first location of the data REs and a second multiplexing operation with the DMRS in a second location of the data REs.

In a seventh aspect, alone or in combination with one or more of the first through sixth aspects, the first location is a first bin that corresponds to a first time and the second location is a second bin that corresponds to a second time.

In an eighth aspect, alone or in combination with one or more of the first through seventh aspects, the communication signal is generated for each of a plurality of symbols in a sub-frame.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
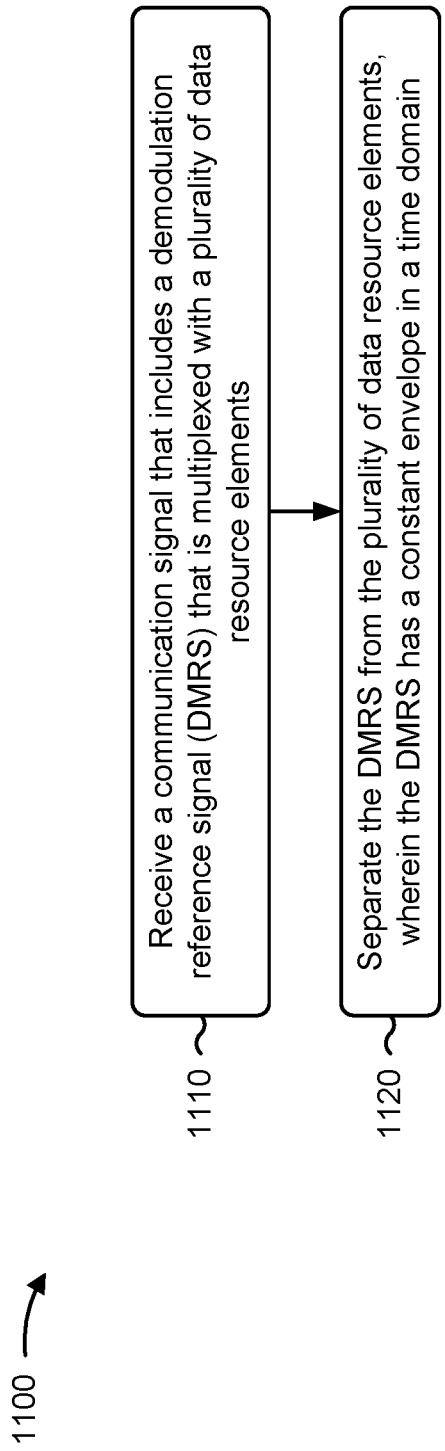
FIG. 11 is a diagram illustrating an example process associated with time DMRS separation for channel estimation, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with time domain DMRS for channel estimation.

As shown in FIG. 11, in some aspects, process 1100 may include receiving a communication signal that includes a DMRS that is multiplexed with a plurality of data REs (block 1110). For example, the UE (e.g., using communication manager 140 and/or reception component 1302, depicted in FIG. 13) may receive a communication signal that includes a DMRS that is multiplexed with a plurality of data REs, as described above, for example, with reference to FIGS. 7, 8, and/or 9.

As further shown in FIG. 11, in some aspects, process 1100 may include separating the DMRS from the plurality of data REs, wherein the DMRS has a constant envelope in a time domain (block 1120). For example, the UE (e.g., using communication manager 140 and/or separation component 1308, depicted in FIG. 13) may separate the DMRS from the plurality of data REs, wherein the DMRS has a constant envelope in a time domain, as described above, for example, with reference to FIGS. 7, 8, and/or 9.

Process 1100 may include additional aspects, such as any single aspect or any combination of aspects described below and/or in connection with one or more other processes described elsewhere herein.

In a first aspect, receiving the communication signal comprises receiving a time domain communication signal that includes the DMRS that is multiplexed with the plurality of data REs.

In a second aspect, alone or in combination with the first aspect, separating the DMRS from the plurality of data REs comprises converting the time domain communication signal into a frequency domain communication signal, and separating, in the frequency domain, the plurality of data REs from a plurality of frequency domain DMRS pilot REs.

In a third aspect, alone or in combination with one or more of the first and second aspects, process 1100 includes converting the plurality of frequency domain DMRS pilot REs to a plurality of DMRS pilot samples having the constant envelope in the time domain.

In a fourth aspect, alone or in combination with one or more of the first through third aspects, process 1100 includes performing frequency and channel estimation based at least in part on the plurality of DMRS pilot samples having the constant envelope in the time domain.

In a fifth aspect, alone or in combination with one or more of the first through fourth aspects, process 1100 includes determining a frequency offset for an OFDM symbol based at least in part on the DMRS having the constant envelope in the time domain.

In a sixth aspect, alone or in combination with one or more of the first through fifth aspects, the DMRS that is multiplexed with the plurality of data REs comprises a first DMRS that is located in a first location of the data REs and a second DMRS that is located in a second location of the data REs.

In a seventh aspect, alone or in combination with one or more of the first through sixth aspects, the first location is a first bin that corresponds to a first time and the second location is a second bin that corresponds to a second time.

In an eighth aspect, alone or in combination with one or more of the first through seventh aspects, the communication signal is generated for each of a plurality of symbols in a sub-frame.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
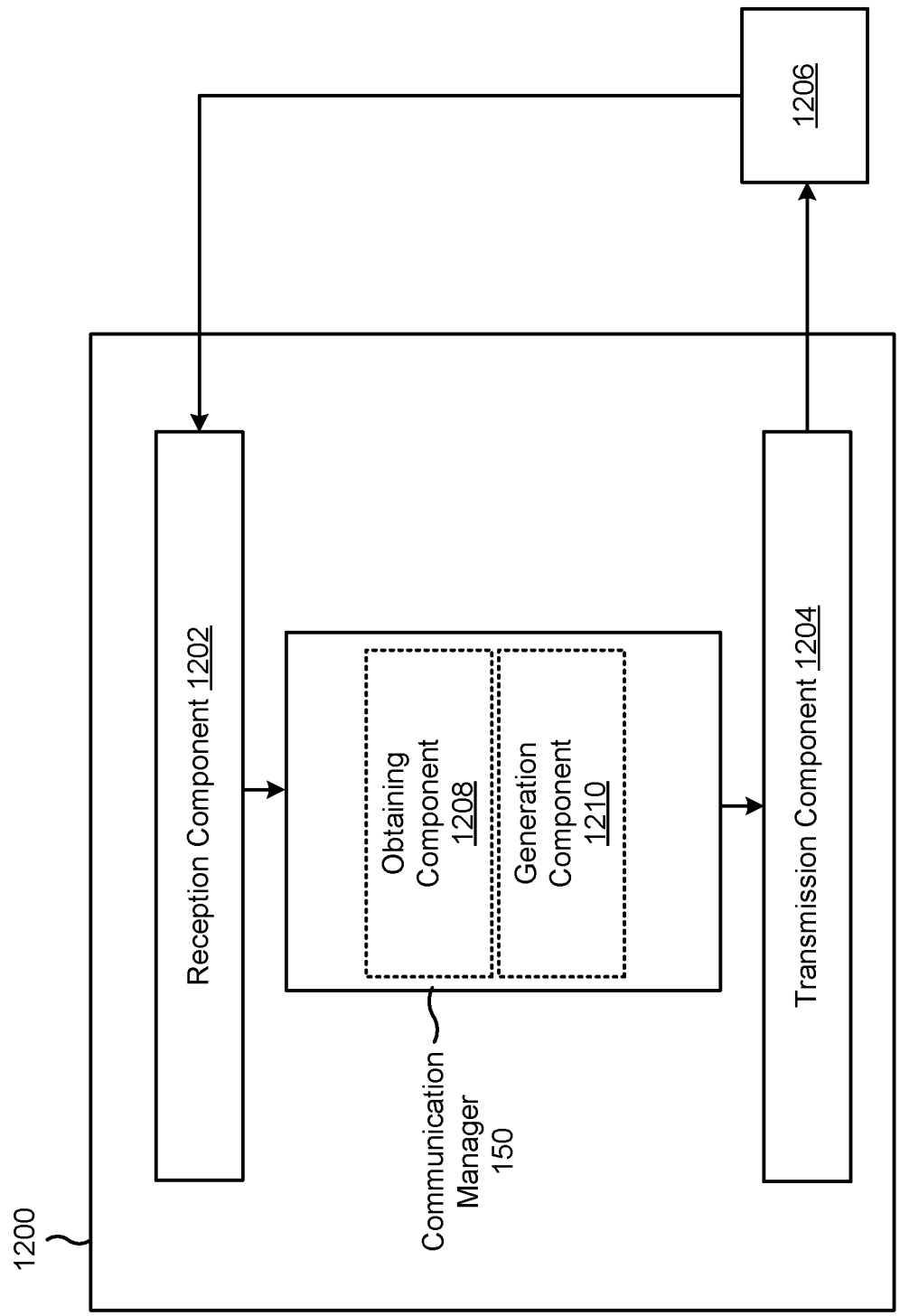
FIG. 12 is a diagram of an example apparatus for wireless communication, in accordance with the present disclosure.

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of an obtaining component 1208 or a generation component 1210, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The obtaining component 1208 may obtain a DMRS having a constant envelope in a time domain. The generation component 1210 may generate a communication signal based at least in part on multiplexing the DMRS with a plurality of data REs.

The transmission component 1204 may transmit the communication signal to a UE or a plurality of UEs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
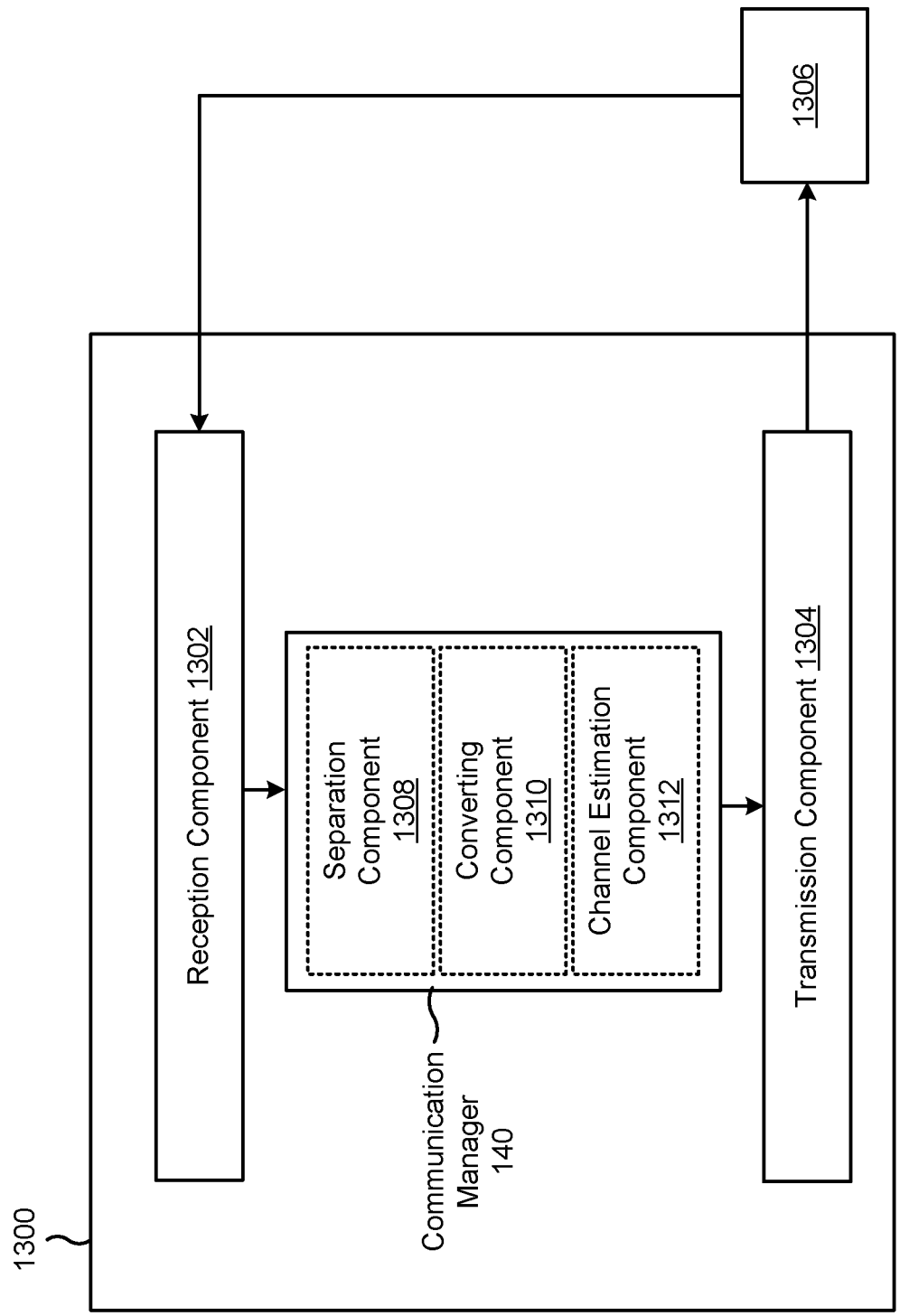
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a separation component 1308, a converting component 1310, or a channel estimation component 1312, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a communication signal that includes a DMRS that is multiplexed with a plurality of data REs. The separation component 1308 may separate the DMRS from the plurality of data REs, wherein the DMRS has a constant envelope in a time domain.

The converting component 1310 may convert the plurality of frequency domain DMRS pilot REs to a plurality of DMRS pilot REs having the constant envelope in the time domain.

The channel estimation component 1312 may perform channel estimation based at least in part on the plurality of DMRS pilot REs having the constant envelope in the time domain.

The channel estimation component 1312 may determine a frequency offset for an OFDM symbol based at least in part on the DMRS having the constant envelope in the time domain.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a network node, comprising: obtaining a demodulation reference signal (DMRS) having a constant envelope in a time domain; and generating a communication signal based at least in part on multiplexing the DMRS with a plurality of data resource elements (REs).

Aspect 2: The method of Aspect 1, wherein obtaining the DMRS having the constant envelope in the time domain comprises generating a plurality of DMRS pilot samples having the constant envelope in the time domain.

Aspect 3: The method of Aspect 2, wherein multiplexing the DMRS with the plurality of data REs comprises: converting the plurality of DMRS pilot samples having the constant envelope in the time domain to a plurality of frequency domain DMRS pilot REs; and multiplexing, in the frequency domain, the plurality of frequency domain DMRS pilot REs with the plurality of data REs.

Aspect 4: The method of Aspect 3, wherein generating the communication signal comprises generating a time domain communication signal based at least in part on an output of the multiplexing of the plurality of frequency domain DMRS pilot REs with the plurality of data REs.

Aspect 5: The method of any of Aspects 1-4, further comprising transmitting the communication signal to a user equipment (UE) or a plurality of UEs.

Aspect 6: The method of any of Aspects 1-5, wherein multiplexing the DMRS with the plurality of data REs comprises multiplexing the DMRS with the plurality of data REs based at least in part on a density indication or a sequence length indication.

Aspect 7: The method of any of Aspects 1-6, wherein multiplexing the DMRS with the plurality of data REs comprises performing a first multiplexing operation with the DMRS in a first location of the data REs and a second multiplexing operation with the DMRS in a second location of the data REs.

Aspect 8: The method of Aspect 7, wherein the first location is a first bin that corresponds to a first time and the second location is a second bin that corresponds to a second time.

Aspect 9: The method of any of Aspects 1-8, wherein the communication signal is generated for each of a plurality of symbols in a sub-frame.

Aspect 10: A method of wireless communication performed by a user equipment (UE), comprising: receiving a communication signal that includes a demodulation reference signal (DMRS) that is multiplexed with a plurality of data REs; and separating the DMRS from the plurality of data resource elements (REs), wherein the DMRS has a constant envelope in a time domain.

Aspect 11: The method of Aspect 10, wherein receiving the communication signal comprises receiving a time domain communication signal that includes the DMRS that is multiplexed with the plurality of data REs.

Aspect 12: The method of Aspect 11, wherein separating the DMRS from the plurality of data REs comprises: converting the time domain communication signal to a frequency domain communication signal; and separating, in the frequency domain, the plurality of data REs from a plurality of frequency domain DMRS pilot REs.

Aspect 13: The method of Aspect 12, further comprising converting the plurality of frequency domain DMRS pilot REs to a plurality of DMRS pilot REs having the constant envelope in the time domain.

Aspect 14: The method of Aspect 13, further comprising performing frequency estimation based at least in part on the plurality of DMRS pilot REs having the constant envelope in the time domain.

Aspect 15: The method of any of Aspects 10-14, further comprising determining a frequency offset for an OFDM symbol based at least in part on the DMRS having the constant envelope in the time domain.

Aspect 16: The method of any of Aspects 10-15, wherein the DMRS that is multiplexed with the plurality of data REs comprises a first DMRS that is located in a first location of the data REs and a second DMRS that is located in a second location of the data REs.

Aspect 17: The method of Aspect 16, wherein the first location is a first bin that corresponds to a first time and the second location is a second bin that corresponds to a second time.

Aspect 18: The method of any of Aspects 10-17, wherein the communication signal is generated for each of a plurality of symbols in a sub-frame.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   one or more memories; and
   one or more processors, coupled to the one or more memories, configured to:
      obtain a plurality of demodulation reference signal (DMRS) pilot samples, the plurality of DMRS pilot samples having a constant envelope in a time domain; and
      generate a communication signal based at least in part on multiplexing the plurality of DMRS pilot samples with a plurality of data resource elements (REs).

2. The apparatus of claim 1, wherein the one or more processors, to obtain the plurality of DMRS pilot samples having the constant envelope in the time domain, are configured to generate the plurality of DMRS pilot samples having the constant envelope in the time domain.

3. The apparatus of claim 2, wherein the one or more processors, to multiplex the plurality of DMRS pilot samples with the plurality of data REs, are configured to:
   convert the plurality of DMRS pilot samples having the constant envelope in the time domain to a plurality of frequency domain DMRS pilot REs; and
   multiplex, in the frequency domain, the plurality of frequency domain DMRS pilot REs with the plurality of data REs.

4. The apparatus of claim 3, wherein the one or more processors, to generate the communication signal, are configured to generate a time domain communication signal based at least in part on an output of the multiplexing of the plurality of frequency domain DMRS pilot REs with the plurality of data REs.

5. The apparatus of claim 1, further comprising a transceiver, wherein the one or more processors are further configured to transmit, via the transceiver, the communication signal to a user equipment (UE) or a plurality of UEs.

6. The apparatus of claim 1, wherein the one or more processors, to multiplex the plurality of DMRS pilot samples with the plurality of data REs, are configured to multiplex the plurality of DMRS pilot samples with the plurality of data REs based at least in part on a density indication or a sequence length indication.

7. The apparatus of claim 1, wherein the one or more processors, to multiplex the plurality of DMRS pilot samples with the plurality of data REs, are configured to perform a first multiplexing operation with the plurality of DMRS pilot samples in a first location of the plurality of data REs and a second multiplexing operation with the plurality of DMRS pilot samples in a second location of the plurality of data REs.

8. The apparatus of claim 7, wherein the first location is a first bin that corresponds to a first time and the second location is a second bin that corresponds to a second time.

9. The apparatus of claim 1, wherein the communication signal is generated for each of a plurality of symbols in a sub-frame.

10. An apparatus for wireless communication at a user equipment (UE), comprising:
    one or more memories; and
    one or more processors, coupled to the one or more memories, configured to:
       receive a communication signal that includes a plurality of demodulation reference signal (DMRS) pilot samples that are multiplexed with a plurality of data resource elements (REs); and
       separate the plurality of DMRS pilot samples from the plurality of data REs, wherein the plurality of DMRS pilot samples have a constant envelope in a time domain.

11. The apparatus of claim 10, wherein the one or more processors, to receive the communication signal, are configured to receive a time domain communication signal that includes the plurality of DMRS pilot samples that are multiplexed with the plurality of data REs.

12. The apparatus of claim 11, wherein the one or more processors, to separate the plurality of DMRS pilot samples from the plurality of data REs, are configured to:
    convert the time domain communication signal into a frequency domain communication signal; and
    separate, in the frequency domain, the plurality of data REs from a plurality of frequency domain DMRS pilot REs.

13. The apparatus of claim 12, wherein the one or more processors are further configured to convert the plurality of frequency domain DMRS pilot REs to the plurality of DMRS pilot samples having the constant envelope in the time domain.

14. The apparatus of claim 13, wherein the one or more processors are further configured to perform a frequency estimation based at least in part on the plurality of DMRS pilot samples having the constant envelope in the time domain.

15. The apparatus of claim 10, wherein the one or more processors are further configured to determine a frequency offset for an OFDM symbol based at least in part on the plurality of DMRS pilot samples having the constant envelope in the time domain.

16. The apparatus of claim 10, wherein the plurality of DMRS pilot samples that are multiplexed with the plurality of data REs comprises a first DMRS pilot sample that is located in a first location of the plurality of data REs and a second DMRS pilot sample that is located in a second location of the plurality of data REs.

17. The apparatus of claim 16, wherein the first location is a first bin that corresponds to a first time and the second location is a second bin that corresponds to a second time.

18. The apparatus of claim 10, wherein a communication signal is generated for each of a plurality of symbols in a sub-frame.

19. A method of wireless communication performed by a network node, comprising:

obtaining a plurality of demodulation reference signal (DMRS) pilot samples, the plurality of DMRS pilot samples having a constant envelope in a time domain; and generating a communication signal based at least in part on multiplexing the plurality of DMRS pilot samples with a plurality of data resource elements (REs).

20. The method of claim 19, wherein obtaining the plurality of DMRS pilot samples having the constant envelope in the time domain comprises generating the plurality of DMRS pilot samples having the constant envelope in the time domain.

21. The method of claim 20, wherein multiplexing the DMRS with the plurality of data REs comprises:
converting the plurality of DMRS pilot samples having the constant envelope in the time domain to a plurality of frequency domain DMRS pilot REs; and
multiplexing, in the frequency domain, the plurality of frequency domain DMRS pilot REs with the plurality of data REs.

22. The method of claim 21, wherein generating the communication signal comprises generating a time domain communication signal based at least in part on an output of the multiplexing of the plurality of frequency domain DMRS pilot REs with the plurality of data REs.

23. The method of claim 19, wherein multiplexing the plurality of DMRS pilot samples with the plurality of data REs comprises multiplexing the plurality of DMRS pilot samples with the plurality of data REs based at least in part on a density indication or a sequence length indication.

24. The method of claim 19, wherein multiplexing the plurality of DMRS pilot samples with the plurality of data REs comprises performing a first multiplexing operation with the plurality of DMRS pilot samples in a first location of the plurality of data REs and a second multiplexing operation with the plurality of DMRS pilot samples in a second location of the plurality of data REs.

25. A method of wireless communication performed by a user equipment (UE), comprising:
receiving a communication signal that includes a plurality of demodulation reference signal (DMRS) pilot samples that are multiplexed with a plurality of data resource elements (REs); and
separating the plurality of DMRS pilot samples from the plurality of data REs, wherein the plurality of DMRS pilot samples have a constant envelope in a time domain.

26. The method of claim 25, wherein receiving the communication signal comprises receiving a time domain communication signal that includes the plurality of DMRS pilot samples that is multiplexed with the plurality of data REs.

27. The method of claim 26, wherein separating the plurality of DMRS pilot samples from the plurality of data REs comprises:
converting the time domain communication signal into a frequency domain communication signal; and
separating, in the frequency domain, the plurality of data REs from a plurality of frequency domain DMRS pilot REs.

28. The method of claim 27, further comprising converting the plurality of frequency domain DMRS pilot REs to the plurality of DMRS pilot samples having the constant envelope in the time domain.

29. The method of claim 28, further comprising performing a frequency estimation based at least in part on the plurality of DMRS pilot samples having the constant envelope in the time domain.

30. The method of claim 25, further comprising determining a frequency offset for an OFDM symbol based at least in part on the plurality of DMRS pilot samples having the constant envelope in the time domain.

* * * * *